United States Patent
Martinson et al.

(10) Patent No.: US 7,025,401 B2
(45) Date of Patent: Apr. 11, 2006

(54) AUTOMATIC TRUCK COVERING ASSEMBLY

(75) Inventors: Todd James Martinson, Holland, MI (US); William G. Pater, Coloma, MI (US)

(73) Assignee: Automated Integrated Systems, Inc., Douglas, MI (US)

( * ) Notice: Subject to any disclaimer, the term of this patent is extended or adjusted under 35 U.S.C. 154(b) by 0 days.

(21) Appl. No.: 10/637,685

(22) Filed: Aug. 11, 2003

(65) Prior Publication Data
US 2005/0035623 A1 Feb. 17, 2005

(51) Int. Cl.
*B60P 7/04* (2006.01)
(52) U.S. Cl. .............. 296/98; 296/100.01; 296/100.14
(58) Field of Classification Search ............... 296/98, 296/100.01, 100.11, 100.12, 100.13, 100.14, 296/100.15, 100.18; 160/67, 68, 69, 71, 160/78, 80
See application file for complete search history.

(56) References Cited

U.S. PATENT DOCUMENTS

| | | | | |
|---|---|---|---|---|
| 3,586,365 | A | * | 6/1971 | Dickson et al. ........ 296/100.12 |
| 3,759,568 | A | * | 9/1973 | Unruh .......................... 296/98 |
| 4,046,416 | A | * | 9/1977 | Penner ......................... 296/98 |
| 4,516,802 | A | * | 5/1985 | Compton ..................... 296/98 |
| 4,795,206 | A | * | 1/1989 | Adams ......................... 296/98 |
| 4,874,196 | A | * | 10/1989 | Goldstein et al. ............. 296/98 |
| 5,031,955 | A | | 7/1991 | Searfoss |
| 5,275,459 | A | * | 1/1994 | Haddad, Jr. ............. 296/100.18 |
| 5,482,347 | A | * | 1/1996 | Clarys et al. ................. 296/98 |
| 5,752,735 | A | * | 5/1998 | Fleming et al. ............... 296/98 |
| 5,829,819 | A | | 11/1998 | Searfoss |
| 5,887,937 | A | * | 3/1999 | Searfoss ..................... 296/122 |
| 5,957,523 | A | * | 9/1999 | Haddad, Jr. ................... 296/98 |
| 6,079,767 | A | * | 6/2000 | Faubert et al. .............. 296/155 |
| 6,435,600 | B1 | * | 8/2002 | Long et al. ................. 296/155 |

(Continued)

Primary Examiner—Patricia L. Engle
(74) Attorney, Agent, or Firm—Varnum, Riddering, Schmidt & Howlett

(57) ABSTRACT

A covering assembly for covering an open container of a vehicle is characterized by the provision that the electric circuit controlling the movement of the cover is automatically opened when the cover reaches either the fully covered position or the fully uncovered position. The assembly includes a flexible cover attached at one end of the container body by a cover spool for retraction and extension the cover over the open container body. The cover spool is spring biased tending to uncover the open container. A bail assembly is pivotally mounted with a cover support section connected to the second end of the cover and is spring biased so as to extend the cover over the open container. A motor assembly rotates the spool and is controlled by an electric circuit that is automatically opened when the cover reaches either the fully covered position or the fully uncovered position. The motor assembly includes: a shaft locking mechanism to prevent the cover spool from back driving the motor, a clutch for decoupling the motor for operative torques above a particular value, and a disconnection mechanism for allowing ease of rotation of the cover spool when the motor assembly is not powered. In an alternative embodiment, the second end of the cover is attached to a pair of cables on each side of the container extending around a front and rear pulley wheels mounted on the front and back of the container. The front pulley wheels are attached to a shaft rotatably coupled to a motor assembly. The motor assembly rotates the shaft and moves the second end of the cover between the fully covered position and the fully uncovered position. The motor assembly is controlled by an electric circuit that is automatically opened when the cover reaches either the fully covered position of the fully uncovered position.

26 Claims, 5 Drawing Sheets

U.S. PATENT DOCUMENTS

| | | | |
|---|---|---|---|
| 6,464,283 B1 * | 10/2002 | Haddad, Jr. | 296/98 |
| 6,474,719 B1 | 11/2002 | Henning | |
| 6,491,332 B1 * | 12/2002 | De Ceuster | 296/37.16 |
| 6,637,800 B1 * | 10/2003 | Henning | 296/100.15 |
| 6,695,383 B1 * | 2/2004 | Wood | 296/98 |
| 6,712,419 B1 * | 3/2004 | Gothier | 296/100.15 |
| 2002/0033615 A1 * | 3/2002 | Henning | 296/98 |
| 2002/0067048 A1 * | 6/2002 | Haddad, Jr. | 296/98 |
| 2002/0140249 A1 * | 10/2002 | Henning | 296/98 |

* cited by examiner

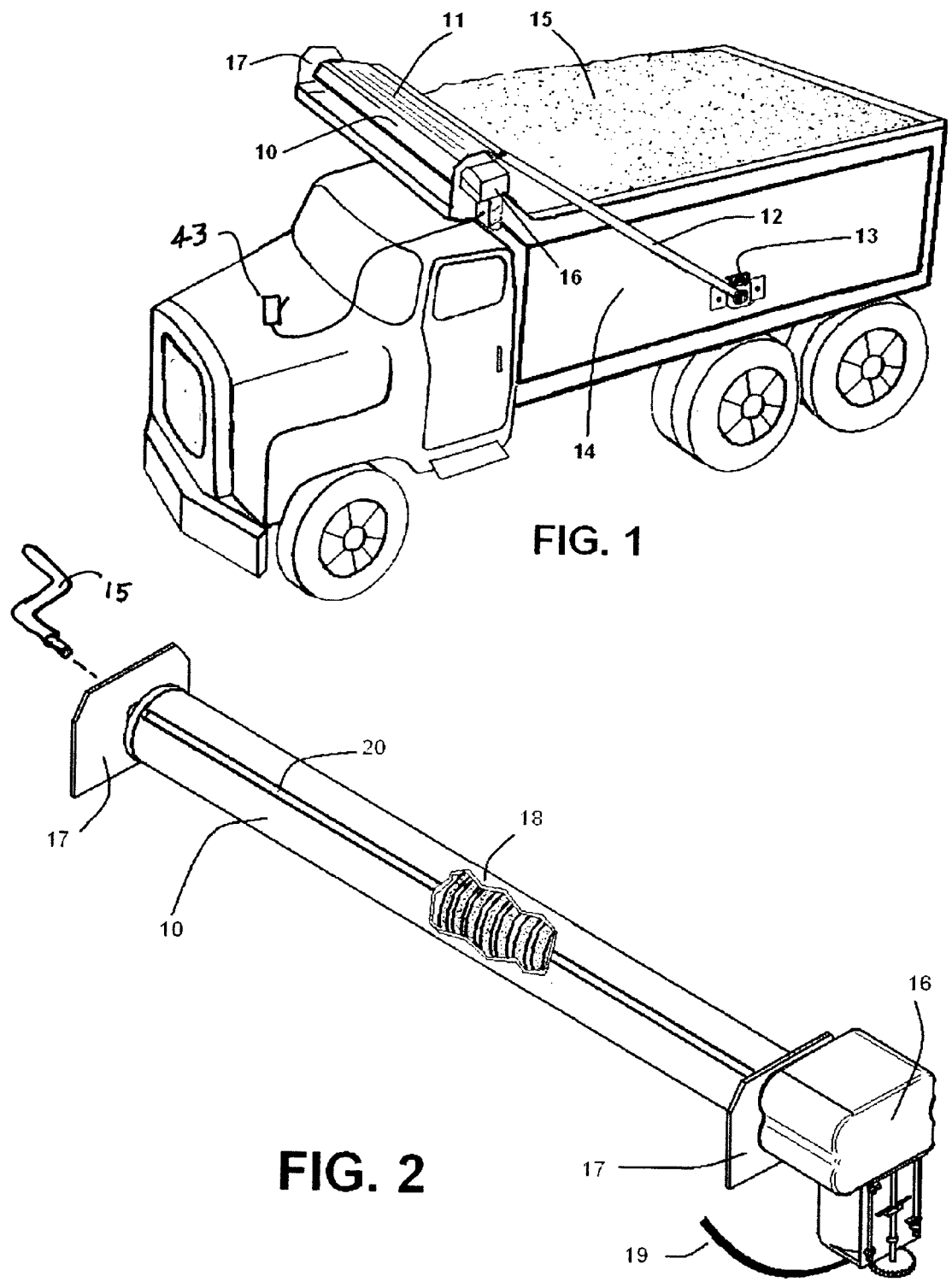

AUTOMATIC TRUCK COVERING ASSEMBLY

BACKGROUND OF THE INVENTION

A variety of types of truck covering assemblies are used with trailers, truck beds, dump trucks, or other transport vehicles. The primary reason for a tarp cover assembly is to either prevent the load from escaping or to protect the load from the elements. The type of covering assembly used generally depends upon the geometry of the trailer, truck bed, dump truck or transport vehicle. Usually these covering assemblies are bulky and awkward to manually operate. For those reasons a variety of motor assemblies have been used to allow for easier operation of the covering systems.

Such motor assemblies used with truck covering assemblies in the past have been controlled by momentary switches which require the operator to visually examine the position of the cover while it is moving from either the fully covered position to the fully uncovered position or from the fully uncovered position to the fully covered position and released the switch when the cover reaches the desired position. The visual examination by the operator is burdensome and undesirable. Additionally, one common type of truck covering assembly comprises of a bail assembly that is pivotally mounted with a cover support section connected to one end of the cover and is spring biased so as to extend the cover over the open container. This type of covering assembly requires a large motor assembly to overcome the spring bias of the bail assembly in the movement from the covered position to the uncovered position. Furthermore, such motor assemblies are subjected to the harsh outdoor environment and prone to failure of electrical components or getting struck and damaged. U.S. Pat. No. 5,829,819 describes a novel friction disc brake arrangement that is actuated by an electric circuit in conjunction with the drive motor for automatic braking the truck covering motor when the electric motor is turned off.

BRIEF SUMMARY OF THE INVENTION

The primary object of the present invention is to provide an improved truck covering assembly for covering an open container of a vehicle including a device to automatically stop the movement of the truck cover when the cover reaches either the fully covered position or the fully uncovered position. This improved truck covering assembly contains a pair of buttons that allows the operator to choose either the covered or uncovered direction of the truck cover. The truck cover will then move in the direction desired by the operator and stop the movement of the cover when the cover reaches either the fully covered position or the fully uncovered position. The operator is not required to observe the cover assembly to determine when to release the switch to stop the movement of the truck cover.

Another object of the present invention is to provide an improved mechanism for winding the truck cover against the biasing force of the bail assembly. The bail assembly is pivotally mounted to the vehicle and biases the truck cover towards the fully covering position. This improved mechanism for winding the truck cover is spring biased tending to uncover the open container allowing for a reduced sized motor assembly for winding the truck cover. Still another object of the present invention is to provide an improved truck covering assembly with a motor assembly that is more durable and less prone to electrical component failure.

BRIEF DESCRIPTION OF THE DRAWINGS

These and other objects, features, and advantages of the present invention are readily apparent from the following detailed description and drawings in which:

FIG. 1 is a side perspective view of a truck on which an automatic truck covering assembly is installed of the present invention;

FIG. 2 is a perspective view of the electric motor assembly with enclosure cover removed and the cover spool with a section removed to show the torsion spring of the present invention;

DETAILED DESCRIPTION OF THE INVENTION

Figure 3:
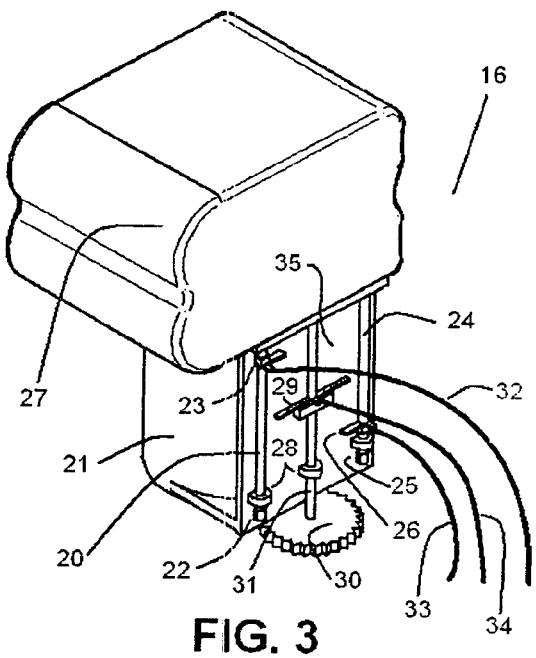
FIG. 3 is a perspective view of the electric motor assembly with the automatic stopping means and enclosure cover removed of the present invention.
Figure 4:
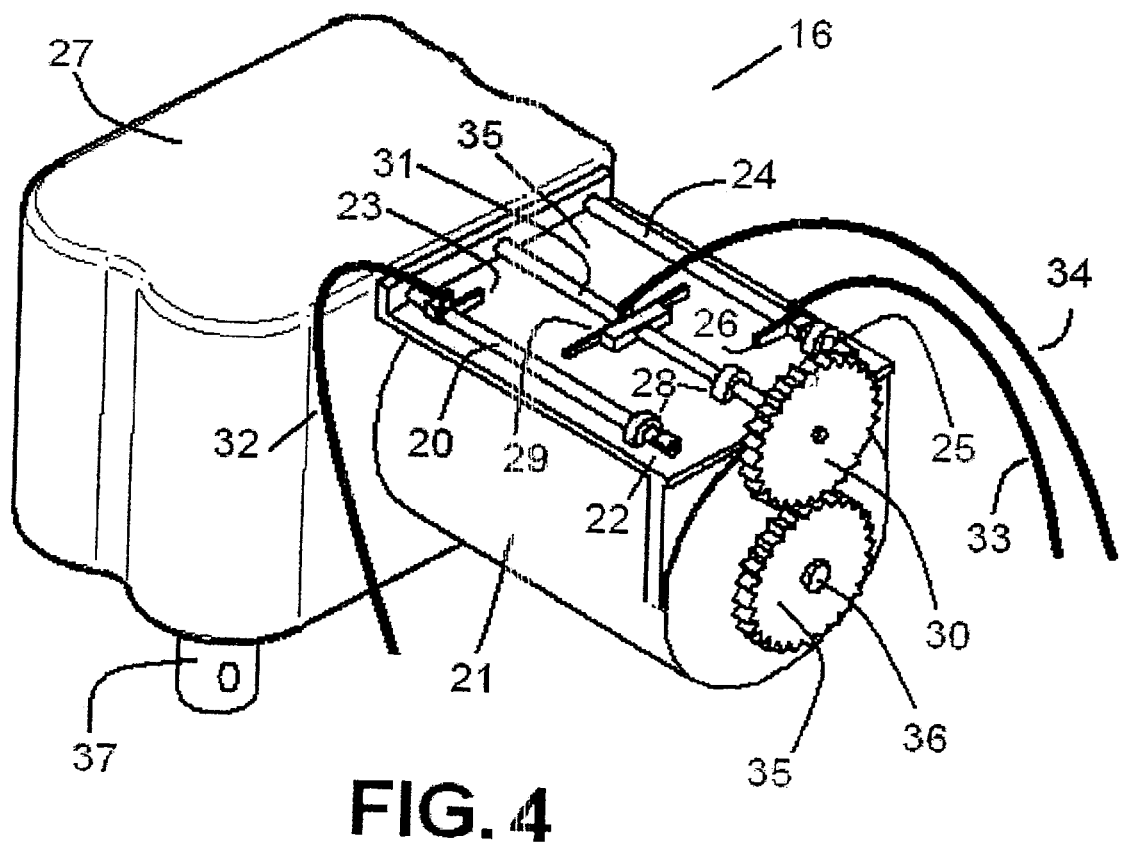
FIG. 4 is a perspective view of the electric motor assembly with the automatic stopping means and enclosure cover removed of the present invention.
Figure 5:
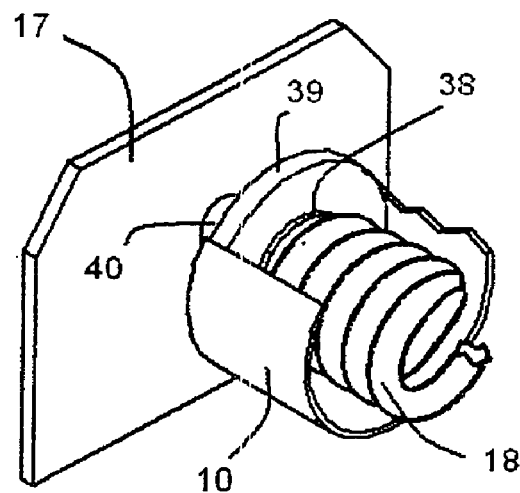
FIG. 5 is a detail perspective view of the cover spool with parts removed of the present invention.
Figure 6:
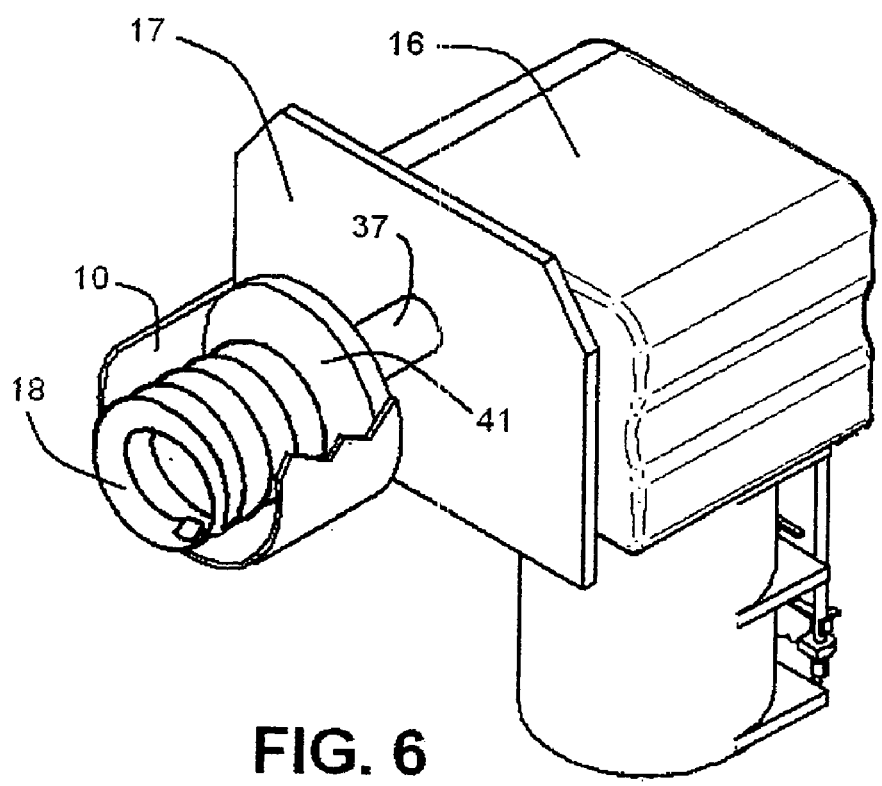
FIG. 6 is a detail perspective view of the cover spool with parts removed, electric motor assembly with the automatic stopping means and enclosure cover removed of the present invention.
Figure 7:
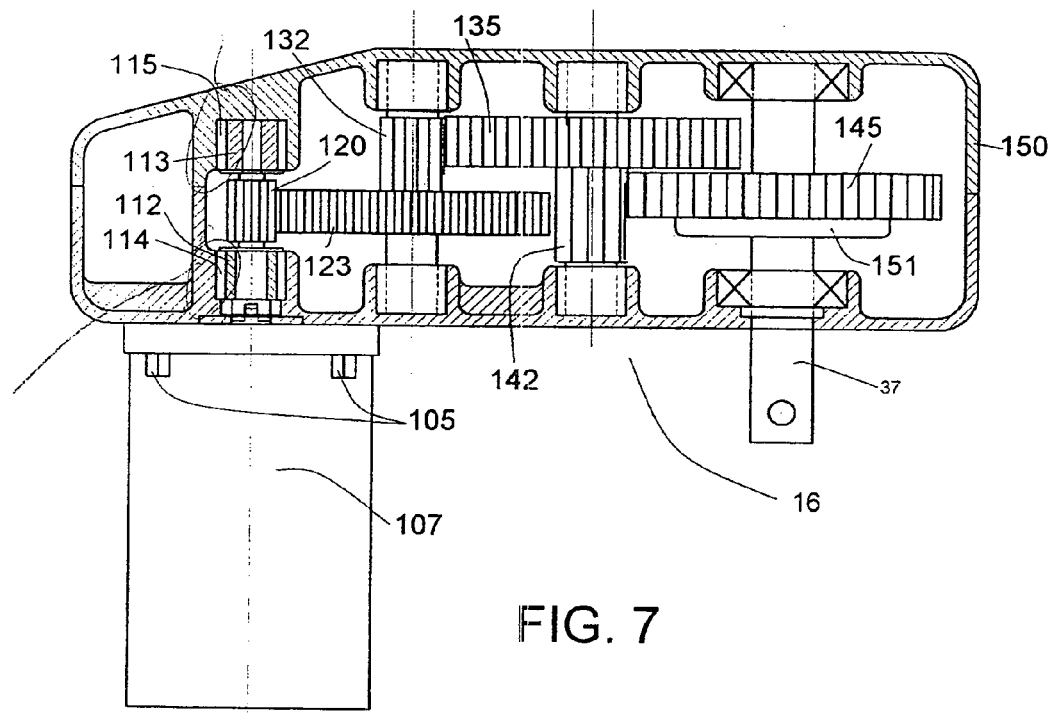
FIG. 7 is a detailed sectional view of the electric motor assembly of the third object of the present invention.
Figure 8:
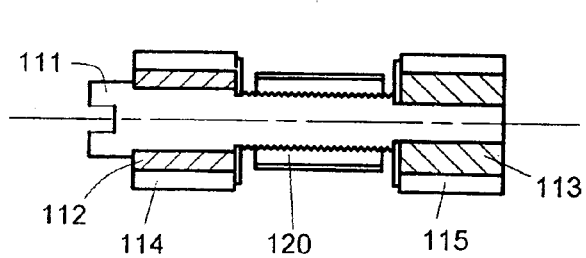
FIG. 8 is a detailed sectional view of locking feature in a neutral position of the electric motor assembly of the third object of the present invention.
Figure 9:
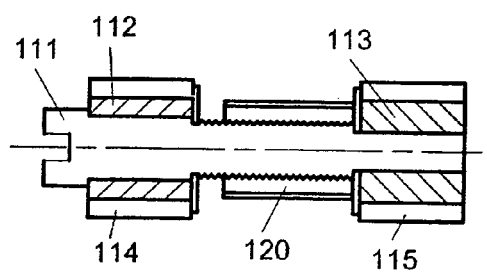
FIG. 9 is a detailed sectional view of locking feature locked in one direction of the electric motor assembly of the third object of the present invention.
Figure 10:
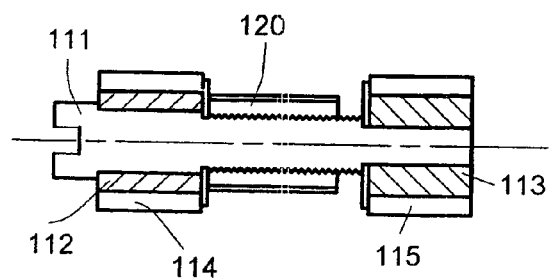
FIG. 10 is a detailed sectional view of locking feature locked in the opposite direction of the electric motor assembly of the third object of the present invention.

As shown in FIG. 1, the truck cover assembly is operable to cover the open container 14 of a vehicle having front, rear, side and bottom walls. The flexible cover 11 is attached at one end of the container body to a cover spool 10. The cover spool 10 is rotatably attached to the open container 14 by two mounting plates 17. The opposite end of the flexible cover 11 is attached to the bail assembly 12. This bail assembly 12 includes a conventional spring biasing means 13 to pivotally rotate the bail assembly 12 towards the end of the open container 14 opposite the cover spool 10 so as to cover the open container 14. The cover spool 10 is interconnected to the motor assembly 16, which may be electric, hydraulic or pneumatic, for winding and unwinding the flexible cover 11 onto the cover spool 10. A hand crank 15 alternatively can be used to rotate the cover spool.

Figure 11:
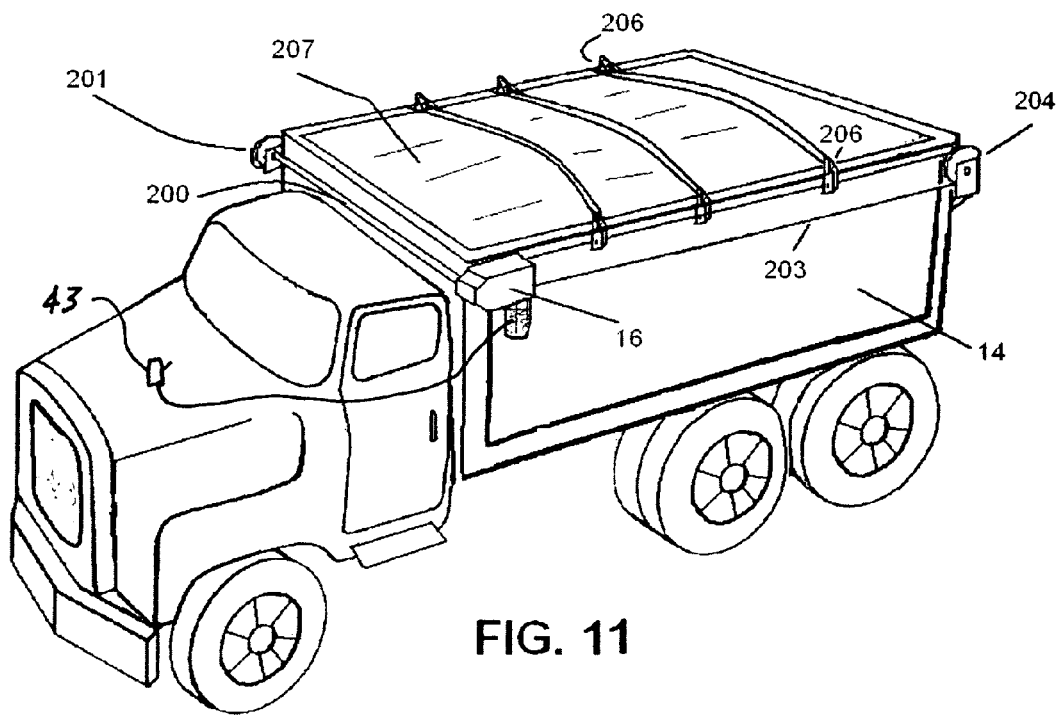
FIG. 11 is a side perspective view of a truck on which an automatic truck covering assembly is installed of the present invention.
Figure 12:
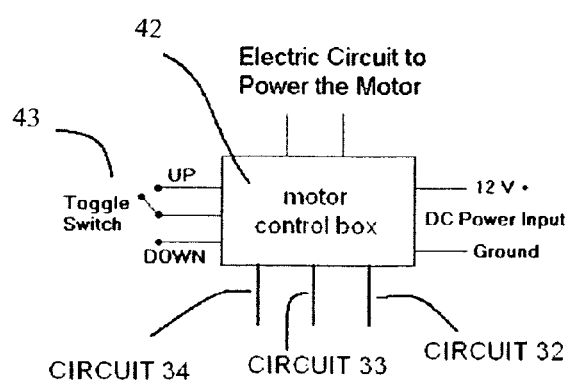
FIG. 12 is an illustration of the electric control box for the automatic truck covering assembly of the present invention.

As shown in FIG. 11, the truck cover assembly is operable to cover the open container 14 of a vehicle having front, rear, side and bottom walls. A flexible cover 207 is attached at the front end of the open container 14. A front shaft 200 rotatably mounted atop the front of the open container 14 having a pair of pulley wheels 201 affixed to the opposite ends and interconnected to the electric motor assembly 16.

A pair of pulley wheels 204 rotatably affixed to the opposite side walls at the rear of the open container 14. A pair of cables 203 each extending around the pulley wheels 201 and pulley wheels 204 and with one end of the each cable affixed to the second end 206 of the flexible cover 207.

In accordance with a primary characterizing feature of the invention referring now to FIGS. 1, 3, 4, 11, & 12 the electric motor assembly 16 is operated by an electric circuit control box 43. The control box 43 contains a Microchip PIC model 12C508 and two PCB power relays. The truck covering assembly operator momentarily presses the desired direction on a toggle switch 42 to select either to cover or uncover the open container 14. The preferred toggle switch 42 is manufactured by ALPS of Japan (Part Number is 25726937) and contains a contact for express cover or uncover. Closing of the circuit in the toggle switch 42 activates the control box 43 to power the electric motor assembly 16 in the desired direction. While the electric motor 21 is causing the rotation of output shaft 37 through gearbox 27 the electric motor 21 also rotates gear 35 mounted on the motor shaft 36. The rotation of gear 35 rotates meshed gear 30. Gear 30 is interconnected to shaft 31. Shaft 31 has exterior translating screw threads that mesh with the interior translating screw threads of contact 29. As contact 29 translates along shaft 31 it will electrically connect contact 29 with either contact 26 or contact 23 depending upon the direction of rotation. The electrically connection of contact 29 with contact 26 will close circuit 33 and circuit 34, and the electrically connection of contact 29 with contact 23 will close circuit 33 and circuit 32. Closing either of these circuits will signal to the control box 43 to open the electric circuit to the motor thus stopping the electric motor assembly 16 from rotating. Contact 23 has interior translating screw threads that mesh with the exterior translating screw threads on shaft 20. Contact 26 has interior translating screw threads that mesh with the exterior translating screw threads on shaft 24. Shaft 20 and shaft 24 are formed with slotted screw heads 22 and 25 respectively on one end. Mounts 28 show an example of how shaft 20, 31, & 24 are all rotatable connected to the electric motor housing. When the truck covering assembly is installed on the vehicle the installer adjusts the position of contact 23 and contact 26 by rotating slotted screw heads 22 and 25 respectively. The installer will adjust the position of the two contacts 23 and 26 so that connection of contact 29 with contact 23 is when the bail assembly 12 is at the fully covered position and the connection of contact 29 with contact 26 is when the bail assembly 12 is at the fully uncovered position. It is important to note that an enclosure is used to completely cover the electric motor assembly 16 to protect it from the harsh environment.

In accordance with another feature of the invention referring now to FIGS. 1, 2, 5, & 6 the cover spool 10 houses a torsion spring 18 that will transmit a force from the cover spool 10 through the flexible cover 11 attached to the cover spool groove 20 and to the bail assembly 12. One end of the torsion spring 18 is interconnected to the mounting plate 17 opposite the electric motor assembly 16 through shaft 40. This connection holds this end of the torsion spring 18 from rotating. The opposite end of the torsion spring 18 is interconnected to the motor output shaft 37 through end plate 41. This connection allows this end of the torsion spring 18 to rotate with the motor output shaft 37. The cover spool 10 in interconnected to the end plate 41. At the opposite end the cover spool 10 is interconnected to end plate 39. End plate 39 is mounted to a standard bearing 38 which allows the cover spool 10 to rotate freely about shaft 40. The torsion spring 18 will bias the bail assembly 12 to the end of the open container 14 where the cover spool 10 is mounted so as to uncover the open container 14. The preferred method is to correctly size the torsion spring 18 so as when the bail assembly 12 is at the end of the open container opposite the cover spool 10 the bias force produced by the torsion spring 18 equals that of the bail assembly 12. At this covered position when the electric power to the electric motor assembly 16 is off the electric motor assembly 16 will restrain the cover spool 10 from rotating thus removing the force from the torsion spring 18 through the flexible cover 11. Restraining the cover spool 10 at this covered position allows the bail assembly 12 to provide the necessary spring bias force to hold the bail assembly 12 in the covered position. It is important to note the benefit that when the truck cover assembly is in the covered position and the electric motor assembly 16 is rotating in the direction to wind the flexible cover 11 onto the cover spool 10 the torque needed by the electric motor assembly 16 is greatly reduced compared to the prior-art assemblies.

In accordance with another feature of the invention referring now to FIGS. 1, 7, 8, 9, & 10 the electric motor assembly 16 includes an electric motor 107 and a transmission housing 150. An output shaft 37 extends from the transmission housing 150 for driving the cover spool 10. The DC motor 107 is directly connected to the transmission housing by bolts 105. The gear 120 drives a number of rotatable transmission spur gears 123,132,135,142,145 that in turn drive the output shaft 37. In the preferred embodiment depicted in the drawing, the motor driven armature shaft is connected to the input shaft 111. This input shaft 111 is supported for rotation within bushing 112 and 113. These bushings are supported for one-directional rotation within the one-way bearings 114 and 115, which are fixedly mounted within the transmission housing 150. The gear 120 is threaded onto the input shaft 111 using translating screw threads. When the motor 107 is energized to rotate in the forward direction the motor armature shaft rotates the input shaft 111. The input shaft 111 rotates inside of the gear 120 moving the gear 120 against the bushing 113. When gear 120 contacts bushing 113 the rotating motion of the input shaft 111 then causes the gear 120 and the bushing 113 to rotate in the one-way bearing 115. The rotation of gear 120 causes the transfer of the torque through gears 123,132,135,142,145 to rotate the output shaft 140. In the event that a back-torque is applied to the output shaft 37 spurs gears 123, 132, 135, 142, 145 will transfer the back-torque to the gear 120. The gear 120 is against bushing 113 and bushing 113 cannot rotate backwards in the one-way bearing 115. This will lock the shaft 37 from back-driving the gears in this direction. When the motor 107 is energized to rotate in the opposite direction the armature shaft 110 rotates the input shaft 111. The input shaft 111 rotates inside of the gear 120 moving the gear 120 against the bushing 112. When gear 120 contacts bushing 112 the rotating motion of the input shaft 111 then causes the gear 120 and the bushing 112 to rotate in the one-way bearing 114. The rotation of gear 120 causes the transfer of the torque through gears 123,132,135,142,145 to rotate the output shaft 37. In the event that a back-torque is applied to the output shaft 140 spurs gears 123, 132, 135, 142, 145 will transfer the back-torque to the gear 120. The gear 120 is against bushing 112 and bushing 113 cannot rotate backwards in the one-way bearing 114. This will lock the shaft 37 from back-driving the gears in this direction.

Gear 145 is fixed with torque-limiting clutch 151 that will slip at torques above a critical value. This torque-liming clutch 151 is of a ball-detent type manufactured by Global Linear. The critical value set for this torque-limiting clutch 151 is at a torque approximately 125% greater than that required to move the cover from the covered position to the uncovered position. This torque-liming clutch 151 will protect the truck covering assembly from damage due to excessive torques transmitted by the electric motor assembly 16.

The foregoing discussion discloses preferred examples of the present invention. One skilled in the art will readily recognize from such discussion, and from the accompanying drawings and claims, which various changes, modifications, and variations can be made therein without departing form the scope of the invention as defined in the following claims.

What is claimed is:

1. A covering assembly for covering an open-topped vehicle container body having front, rear, and opposite side walls with upper edges, said covering assembly comprising:
    (a) a flexible tarp cover having first and second ends and being of a size to substantially cover the open container body;
    (b) a cover spool proximate the upper edge of one wall and rotatably connected with said open container, said spool receiving the first end of said cover and being attached thereto substantially across said spool width, said spool having associated biasing means tending to rotate said spool so as to wind said cover onto said spool and uncover said open container;
    (c) a bail assembly for extending said cover over said open container, said bail assembly comprising a pair of spaced generally parallel legs pivotally mounted at one end at each side of said open container, a cover support section connecting second ends of said legs, means for connecting said cover support section to the second end of said cover, and bias means for biasing said cover support section in the direction so as to extend said cover over said open container;
    (d) means to rotate said spool in opposite directions, with movement in a first direction serving to wind said cover onto the said spool and uncover said open container, movement in a second direction serving to unwind said cover and cover said open container.

2. The assembly of claim 1, wherein the means to rotate said spool is a reversible motor operatively connected to said spool for causing rotation in both directions thereof, said motor being actuated by an electric circuit, the electric circuit being actuated by a switch positioned for manual actuation by a vehicle operator.

3. The assembly of claim 2, further comprising automatic shutoff means for automatically breaking said electric circuit when the second end of said cover approaches the position wherein said open container is covered.

4. The assembly of claim 3, further comprising means for automatically breaking said electric circuit when the second end of said cover approaches the position wherein said open container is uncovered.

5. The assembly of claim 2, wherein at least one limit switch mounted and connected to said electric circuit for stopping said spool from rotating when the second end of said cover approaches the position wherein said open container is covered.

6. The assembly of claim 2, further comprising:
    (a) a control means for controlling said electric circuit to rotate said spool;
    (b) at least one limit switch mounted and connected to the control means for stopping the spool from rotating when the second end of said cover approaches the position whereas said open container is covered;
    (c) a limit member separate from the spool, cover and bail assembly for engagement the limit switch;
    (d) means continuously connected to said motor and separate from said spool for driving the limit member and engaging the limit switch when second end of said cover has reached the position whereas said open container is covered.

7. The system of claim 2 further comprising of a method for programmably moving the second end of said cover to a predetermined position comprising:
    (a) a powered actuator means communicating with said motor for rotating said spool and moving second end of said cover;
    (b) sensing whether second end of said cover is in a predetermined position,
    (c) actuating said motor in response to said actuator means if second end of said cover is other than in said predetermined position to second end of said cover into said predetermined position;
    (d) deactuating said motor when second end of said cover arrives at said predetermined position.

8. The system of claim 7 wherein the predetermined position is the position whereas said open container is covered.

9. The assembly of claim 2, further comprising:
    (a) a means for mechanically limiting the rotation of the spool to a predetermined number of rotations;
    (b) a means for automatically breaking said electric circuit when said motor has rotated said spool the predetermined number of rotations;
    (c) said predetermined number of rotation is spool rotations necessary to allow the second end of said cover to travel from the uncovered position to the covered position.

10. The assembly of claim 2, further comprising means for automatically stopping the rotation of said spool when the second end of said cover approaches the position whereas said open container is covered.

11. The assembly of claim 1, wherein means to rotate said spool is a hand crank operatively connected to said spool for causing rotation in both directions thereof.

12. The assembly of claim 1, wherein means to rotate said spool is a pneumatic activator or a hydraulic activator operatively connected to said spool for causing rotation in both directions thereof.

13. A covering assembly for covering an open-topped vehicle container body having front, rear, and opposite side walls with upper edges, said covering assembly comprising:
    (a) a flexible tarp cover having first and second ends and of a size to substantially cover the open container body;
    (b) a cover spool proximate upper edge of one wall and rotatably connected with said open container, said spool for receiving first end of said cover attached thereto substantially across said spool width, and said spool having associated biasing means tending to rotate said spool so as to wind said cover onto said spool and uncover said open container;
    (c) a bail assembly for extending said cover over said open container, said bail assembly comprising a pair of spaced generally parallel legs pivotally mounted one at each side of said open container, a cover support section connecting said legs, means for connecting said cover support section to second end of said cover, and bias means for biasing said cover support section in the direction so as to extend said cover over said open container;

(d) means to rotate said bail assembly, whereas in the first direction to wind said cover onto the said spool and uncover said open container, whereas in the second direction to unwind said cover and cover said open container;

(e) said means to rotate bail assembly is a pneumatic cylinder or a hydraulic cylinder mounted to said container body and operatively connected with said bail assembly.

14. A covering assembly for covering an open-topped vehicle container body having front, rear, and opposite side walls with upper edges, said covering assembly comprising:

(a) a flexible tarp having first and second ends;

(b) a cover spool proximate upper edge of one wall and rotatably connected with said open container, said spool for receiving first end of said cover attached thereto substantially across said spool width (c) a bail assembly for extending said cover over said open container, said bail assembly comprising a pair of spaced generally parallel legs pivotally mounted one at each side of said open container, a cover support section connecting said legs, means for connecting said cover support section to second end of said cover, and bias means for biasing said cover support section in the direction so as to extend said cover over said open container;

(d) a reversible electric motor operatively connected to said spool for causing rotation in both direction, whereas in the first direction to wind said cover onto the said spool and uncover said open container, whereas in the second direction to unwind said cover and uncover said open container, said motor is actuated by an electric circuit;

(e) means for automatically breaking said electric circuit when the second end of said cover approaches the position whereas said open container is covered.

15. The assembly of claim 14, further comprising means for automatically breaking said electric circuit when the second end of said cover approaches the position whereas said open container is uncovered.

16. The assembly of claim 14, wherein at least one limit switch is mounted and connected to said electric circuit for stopping said spool from rotating when the second end of said cover approaches the position whereas said open container is covered.

17. A covering assembly for covering an open-topped vehicle container body having front, rear, and opposite side walls with upper edges, said covering assembly comprising:

(a) a flexible tarp cover having first and second ends;

(b) a cover spool proximate upper edge of one wall and rotatably connected with said open container, said spool for receiving first end of said cover attached thereto substantially across said spool width;

(c) a bail assembly for extending said cover over said open container, said bail assembly comprising a pair of spaced generally parallel legs pivotally mounted one at each side of said open container, a cover support section connecting said legs, means for connection said cover support section to second end of said cover, and bias means for biasing said cover support section in the direction so as to extend said cover over said open container;

(d) a reversible electric motor connected to said spool for causing rotation in both direction, whereas in the first direction to wind said cover onto the said spool and uncover said open container, whereas in the second direction to unwind said cover and uncover said open container, said motor is actuated by an electric circuit;

(e) a control means for controlling said electric circuit to rotate said spool;

(f) at least one limit switch mounted and connected to the control means for stopping the spool from rotating what the second end of said cover approaches the position whereas said open container is covered;

(g) a limit member separate from the spool, cover and bail assembly for engagement the limit switch;

(h) means continuously connected to said motor and separate from said spool for driving the limit member and engaging the limit switch when second end of said cover has reached the position whereas said open container is covered.

18. A covering assembly for covering an open-topped vehicle container body having front, rear, and opposite side walls with upper edges, said covering assembly comprising:

(a) a flexible tarp cover having first and second ends;

(b) a cover spool proximate upper edge of one wall and rotatably connected with said open container, said spool for receiving first end of said cover attached thereto substantially across said spool width;

(c) a bail assembly for extending said cover over said open container, said bail assembly comprising a pair of spaced generally parallel legs pivotally mounted one at each side of said open container, a cover support section connecting said legs completing the bail, means for connecting said cover support section to second end of said cover, and bias means for biasing said cover support section in the direction so as to extend said cover over said open container;

(d) a reversible electric motor operatively connected to said spool for causing rotation in both direction, whereas in the first direction to wind said cover onto the said spool and uncover said open container, whereas in the second direction to unwind said cover and uncover said open container, said motor is actuated by an electric circuit;

(e) a means for programmably moving the second end of said cover to a predetermined position;

(f) a powered actuator means communicating with said motor for rotating said spool and moving second end of said cover;

(g) sensing whether second end of said cover is in a predetermined position, (h) actuating said motor in response to said actuator means if second end of said cover is other than in said predetermined position to second end of said cover into said predetermined position;

(i) deactuating said motor when second end of said cover arrives at said predetermined position.

19. The system of claim 18 wherein the predetermined position is the position whereas said open container is covered.

20. A covering assembly for covering an open-topped vehicle container body having front, rear, and opposite side walls with upper edges, said covering assembly comprising:

(a) a flexible tarp cover having first and second ends;

(b) a cover spool proximate upper edge of one wall and rotatably connected with said open container, said spool for receiving first end of said cover attached thereto substantially across said spool width;

(c) a bail assembly for extending said cover over said open container, said bail assembly comprising a pair of spaced generally parallel legs pivotally mounted one at each side of said open container, a cover support section connecting said legs completing the bail, means for connecting said cover support section to second end of said cover, and bias means for biasing said cover support section in the direction so as to extend said cover over said open container;
(d) a reversible electric motor operatively connected to said spool for causing rotation in both direction, whereas in the first direction to wind said cover onto the said spool and uncover said open container, whereas in the second direction to unwind said cover and uncover said open container, said motor is actuated by an electric circuit;
(e) a means for mechanically limiting the rotation of the spool to a predetermined number of rotations;
(f) a means for automatically breaking said electric circuit when said motor has rotated said spool the predetermined number of rotations.
(g) said predetermined number of rotation is spool rotations necessary to allow the second end of said cover to travel from the uncovered position to the covered position.

21. A covering assembly for covering an open-topped vehicle container body having front, rear, and opposite side walls with upper edges, said covering assembly comprising:
(a) a flexible tarp cover having first and second ends;
(b) a cover spool proximate upper edge of one wall and rotatably connected with said open container, said spool for receiving first end of said cover attached thereto substantially across said spool width
(c) a bail assembly for extending said cover over said open container, said bail assembly comprising a pair of spaced generally parallel legs pivotally mounted one at each side of said open container, a cover support section connecting said legs, means for connecting said cover support section to second end of said cover, and bias means for biasing said cover support section in the direction so as to extend said cover over said open container;
(d) a reversible electric motor operatively connected to said spool for causing rotation in both direction, whereas in the first direction to wind said cover onto the said spool and uncover said open container, whereas in the second direction to unwind said cover and uncover said open container, said motor is actuated by an electric circuit;
(e) means for automatically stopping the rotation of said spool when the second end of said cover approaches the position whereas said open container is covered.

22. A covering assembly for covering an open-topped vehicle container body having front, rear, and opposite side walls with upper edges, said covering assembly comprising:
(a) a flexible tarp cover having first and second ends;
(b) a cover spool proximate upper edge of one wall and rotatably connected with said open container, said spool for receiving first end of said cover attached thereto substantially across said spool width
(c) a bail assembly for extending said cover over said open container, said bail assembly comprising a pair of spaced generally parallel legs pivotally mounted one at each side of said open container, a cover support section connecting said legs, means for connecting said cover support section to second end of said cover, and bias means for biasing said cover support section in the direction so as to extend said cover over said open container;
(d) a pneumatic activator or a hydraulic activator operatively connected to said spool for causing rotation in both directions thereof, whereas in the first direction to wind said cover onto the said spool and uncover said open container, whereas in the second direction to unwind said cover and uncover said open container, said activator is controlled by a switch means;
(e) means for automatically opening said switch and stopping the rotation of said spool when the second end of said cover approaches the position whereas said open container is covered.

23. A covering assembly for covering an open-topped vehicle container body having front, rear, and opposite side walls with upper edges, said covering assembly comprising:
(a) a flexible tarp cover having first and second ends;
(b) a cover spool proximate upper edge of one wall and rotatably connected with said open container, said spool for receiving first end of said cover attached thereto substantially across said spool width
(c) a bail assembly for extending said cover over said open container, said bail assembly comprising a pair of spaced generally parallel legs pivotally mounted one at each side of said open container, a cover support section connecting said legs, means for connecting said cover support section to second end of said cover, and bias means for biasing said cover support section in the direction so as to extend said cover over said open container;
(d) means to rotate said bail assembly, whereas in the first direction to wind said cover onto the said spool and uncover said open container, whereas in the second direction to unwind said cover and cover said open container;
(e) said means to rotate bail assembly is a pneumatic cylinder or a hydraulic cylinder mounted to said container body and operatively connected with said bail assembly, said cylinder is controlled by a switch means;
(f) means for automatically opening said switch and stopping the rotation of said spool when the second end of said cover approaches the position whereas said open container is covered.

24. A covering assembly for covering an open-topped vehicle container body having front, rear, and opposite side walls with upper edges, said covering assembly comprising:
(a) a flexible tarp cover having first and second ends;
(b) a cover spool proximate upper edge of one wall and rotatably connected with said open container, said spool for receiving first end of said cover attached thereto substantially across said spool width;
(c) a bail assembly for extending said cover over said open container, said bail assembly comprising a pair of spaced generally parallel legs pivotally mounted one at each side of said open container, a cover support section connecting said legs completing the bail, means for connecting said cover support section to second end of said cover, and bias means for biasing said cover support section in the direction so as to extend said cover over said open container;
(d) a reversible electric motor operatively connected to said spool for causing rotation in both direction, whereas in the first direction to wind said cover onto the said spool and uncover said open container, whereas in the second direction to unwind said cover and uncover said open container, said motor is actuated by an electric circuit;
(e) a clutch disposed relative to said motor and said spool to provide for a coupling said motor to said spool for operative torques less than a particular value and to provide for a decoupling of said motor to said spool for operative torques above the particular value.

25. A covering assembly for covering an open-topped vehicle container body having front, rear, and opposite side walls with upper edges, said covering assembly comprising:
(a) a flexible tarp cover having first and second ends;
(b) a cover spool proximate upper edge of one wall and rotatably connected with said open container, said spool for receiving first end of said cover attached thereto substantially across said spool width;
(c) a bail assembly for extending said cover over said open container, said bail assembly comprising a pair of spaced generally parallel legs pivotally mounted one at each side of said open container, a cover support section connecting said legs completing the bail, means for connecting said cover support section in the direction so as to extend said cover over said open container;
(d) a reversible electric motor operatively connected to said spool for causing rotation in both direction, whereas in the first direction uncover said open container, whereas in the second direction to cover said open container; said motor including a transmission housing having an output shaft for driving the tarp spool, having intermediate shafts, having transmission gears therein engaging the output shaft, having an input shaft connected to the armature shaft, having a shaft locking mechanism mounted in or on the transmission housing used to couple one said shaft with one said gear, whereas the shaft locking mechanism will allow forward-torque rotation from said input shaft to said output shaft, but whereas the shaft locking mechanism will prevent back-torque rotation from said output shaft to said input shaft.

26. A covering assembly for covering an open-topped vehicle container body having front, rear, and opposite side walls with upper edges, said covering assembly comprising:
(a) a flexible tarp cover having first and second ends, said cover having first end attached at the top of the front of said open container;
(b) a reversible electric motor;
(c) a front shaft rotatably mounted atop the front wall and extending parallel thereto and coupled to the motor whereby the front shaft is rotatable by the motor in opposite directions;
(d) a pair of front pulley wheels affixed to the opposite ends of the front shaft and rotatable therewith, said front pulley wheels being at the opposite side walls;
(e) a pair of rear pulley wheels affixed to the opposite side walls at the rear wall;
(f) a pair of cables each extending around the front and rear pulley wheels of a corresponding side wall of the truck and with one end of each cable affixed to the second end of said cover at said corresponding side wall and the other end of each cable affixed to the second end of said cover at said corresponding said wall;
(g) motor control means actuating a electric circuit for controlling the rotation of the motor in a desired direction whereby the second end of said cover is moved to the rear wall in one direction of rotation of the motor thereby extending the cover over the entire bed and the second end of said cover is moved to the front wall in the opposite direction of rotation of the motor thereby folding the cover;
(h) means for automatically breaking said electric circuit when the second end of said cover approaches the rear of said open container.
(i) means for automatically breaking said electric circuit when the second end of said cover approaches the front of said open container.

* * * * *